(12) United States Patent
Li

(10) Patent No.: US 11,081,896 B2
(45) Date of Patent: Aug. 3, 2021

(54) PORTABLE CHARGER CONNECTION FRAME AND CASE COMPRISING THE SAME

(71) Applicant: FTI GROUP (HOLDING) COMPANY LIMITED, Grand Cayman (KY)

(72) Inventor: Shun-Yu Li, Shanghai (CN)

(73) Assignee: FTI GROUP (HOLDING) COMPANY LIMITED, Grand Cayman (KY)

( * ) Notice: Subject to any disclaimer, the term of this patent is extended or adjusted under 35 U.S.C. 154(b) by 225 days.

(21) Appl. No.: 16/408,131

(22) Filed: May 9, 2019

(65) Prior Publication Data
US 2020/0083723 A1 Mar. 12, 2020

(30) Foreign Application Priority Data
Sep. 12, 2018 (CN) .......................... 201811062414.1

(51) Int. Cl.
*H02J 7/00* (2006.01)
*H01M 50/20* (2021.01)

(52) U.S. Cl.
CPC ........... *H02J 7/0027* (2013.01); *H01M 50/20* (2021.01); *H02J 7/0042* (2013.01)

(58) Field of Classification Search
CPC ..................................................... H02J 7/0045
USPC .......................................................... 320/107
See application file for complete search history.

(56) References Cited

U.S. PATENT DOCUMENTS
10,130,152 B2 * 11/2018 Bhatnagar ................ A45C 5/14

\* cited by examiner

Primary Examiner — Robert Grant
(74) Attorney, Agent, or Firm — Rabin & Berdo, P.C.

(57) ABSTRACT

The present disclosure provides a portable charger connection frame, comprising: a storage box, a cover body, and an engaging element. The storage box comprises a head portion, a body and an end portion which are sequentially connected, wherein the head portion has a head accommodation chamber inside and one side of the body close to the head accommodation chamber has a opening communicating with the head accommodation chamber; the cover body is in the head accommodation chamber, covers the opening, and is pivotally connected to a side wall of the head portion; the engaging element is used to restrict the cover body from leaving the head accommodation chamber. In the present invention, a portable charger is placed in the storage box as well as is directly used and taken through detaching the cover body, therefore charging operation saves time and is effortless.

16 Claims, 5 Drawing Sheets

PORTABLE CHARGER CONNECTION FRAME AND CASE COMPRISING THE SAME

FIELD OF THE INVENTION

The present disclosure relates to a portable charger connection frame and a case comprising the same.

BACKGROUND

Luggage case is used for placing baggage, which is widely used for convenience when people travel or go on a business trip.

As people increasingly use mobile phones and other electronic products and go out frequently, they often encounter situations where electronic products need to be recharged. However, taking the portable charger out of the luggage case is very cumbersome and a waste of time. At the same time, the portable charger can only be placed on the hand during the charging process, which is very inconvenient.

SUMMARY

The technical problem to be solved by the present invention is to overcome the drawback in the prior art that the usage of the portable charger is very inconvenient when people go out with the luggage, thus to provide a portable charger connection frame and a case comprising the same.

The present invention uses the following technology scheme to solve above technical problem.

A portable charger connection frame is characterized in that the portable charger connection frame comprises:

A storage box includes a head portion, a body and an end portion, which are sequentially connected, wherein the head portion has a head accommodation chamber, the body has a body accommodation chamber where a portable charger is placed, and one end of the body accommodation chamber close to the head accommodation chamber has an opening communicating with the head accommodation chamber.

A cover body located in the head accommodation space, and the cover body covers the opening as well as is pivotally connected to a side wall of the head portion.

An engaging element used to restrict the cover body from leaving the head accommodation chamber.

In the present technology scheme, arranging the storage box provides an independent accommodation space for the portable charger; the opening is conveniently uncovered or closed by arranging the cover body pivotally connected to a side wall of the head portion; through arranging the engaging element to restrict the cover body from leaving the head accommodation chamber, thus to protect the portable charger placed in the storage box, meanwhile the cover body can be easily switched between the state of closing the opening and the state of uncovering the opening; through the overall structure, it is avoided that the user is required to take or place the portable charger during using the portable charger, and it is only necessary to release the cover body directly through the engaging element, so that the portable charger in the storage box can be used, which is greatly convenient for user's usage.

Preferably, the cover body comprises an upper cover and a lower cover. The upper cover comprises an upper cover body and a connecting portion which are connected to each other. The lower cover is fastened to a lower edge of the upper cover body. One side of the connecting portion is provided with a first mounting hole. One end of a pin is located in a first mounting hole, and the other end of the pin is located in a second mounting hole on the side wall of the head portion.

In the present technology scheme, that the cover body rotates around the side wall of the head portion is performed through arranging the first mounting hole and the second mounting hole respectively at two ends of the pin, thus to uncover or close the opening easily.

The cover body further includes a cover elastic member. The cover elastic member is located in the first mounting hole. The cover elastic member is disposed between the pin and the first mounting hole.

In the present technology scheme, through arranging the cover elastic member, the cover body is conveniently detached from the side wall of the head portion, thus to facilitate installation and maintenance work.

Preferably, the upper cover further includes a plurality of ribs. The plurality of ribs are all disposed on one surface of the upper cover body facing the head accommodation chamber. The plurality of ribs all extend to one end of the connecting portion away from the body from the other end of the connecting portion close to the body.

In the present technology scheme, through arranging the ribs to reinforce the support between body and the connecting portion, meanwhile the weight of the overall structure itself and the manufacturing cost are reduced, and there also is an effect of avoiding the deformation of the upper cover.

Preferably, the engaging element comprises:

A button, one end of the button is slidably disposed on an outer wall of the cover body, and the other end of the button arranged with a lock block, and one end of the lock block is located in the cover body, and the head portion of the storage box is arranged with a through hole at a position corresponding to the lock block, and the other end of the lock block is engaged into the through hole.

A first resilient member is in the cover body, and the first resilient member is disposed between the lock block and the inner wall of the cover body in the horizontal direction.

Wherein, when the button encounters external force directed away from the through hole in the horizontal direction, the lock block is disengaged from the through hole, which makes the cover body able to be separated from the head accommodation chamber.

Preferably, the upper surface of the button is arranged with a plurality of non-slip portions, and the plurality of non-slip portions are parallel to each other and perpendicular to the sliding direction of the button, and the non-slip portions are arranged to adjoin each other.

In the present technology scheme, through arranging the non-slip portions to increase the frictional force of the contact surface, applied force is saved when the user slides the button.

Preferably, one end of the head portion of the storage box near the body of the storage box is arranged with a fastening element used for restricting the portable charger leaving the body accommodation chamber. The fastening element comprises a sliding member, a second resilient member and a connecting member, and the position-limiting recess is made on the side wall of the head portion, and the sliding member extends into the position-limiting recess. One end of the connecting member is outside the position-limiting recess, and the second resilient member is inside the position-limiting recess. One end of the second resilient member connects to the sliding member, and the other end of the second resilient member connects to the other end of the connecting member. The sliding member can enter the head accommodation chamber or back away out of the head accommodation chamber.

Preferably, the end portion of the storage box is arranged with an end accommodation chamber, one end of the end accommodation chamber communicates with the body accommodation chamber, and the other end of the end accommodation chamber is fastened with a rear cover. A supporting element is disposed in the end accommodation chamber for supporting the portable charger. The supporting element includes a support frame, a support base and a third resilient member. One end of the support base is fixed to a surface of the rear cover facing the end accommodation chamber, and the other end of the support base is located in the end accommodation chamber. The support frame is used to support the portable charger, and the third resilient member is connected to the support base and the support frame.

In the present technology scheme, through providing the supporting element to exert outward ejection force on the portable charger all the time, so that when the fastening element releases the portable charger, the portable charger can be easily ejected, and the user can conveniently take the portable charger.

Preferably, the portable charger connection frame further includes a sheath that is fixed to the outer periphery of the head portion of the storage box.

In the present technology scheme, through providing the sheath, for one thing the portable charger connection frame is protected, and besides it is convenient to subsequently install the luggage charging device on the shell of the case.

The present invention also provides a case, which is characterized in that the case comprises a portable charger connection frame as above.

The positive progress of the invention lies in:

As for the portable charger connection frame and the case comprising the same according to the present invention, the portable charger is placed into the storage box, and the portable charger is directly used, taken and placed through detaching the cover body, such that the charging operation saves time and is easy.

DETAILED DESCRIPTION OF PREFERRED EMBODIMENTS

In order to further understand the structure, usage and features of the present disclosure more clearly and in detail, the present disclosure is described in detail below with references to the accompanying drawings and specific preferred embodiments.

Figure 1:
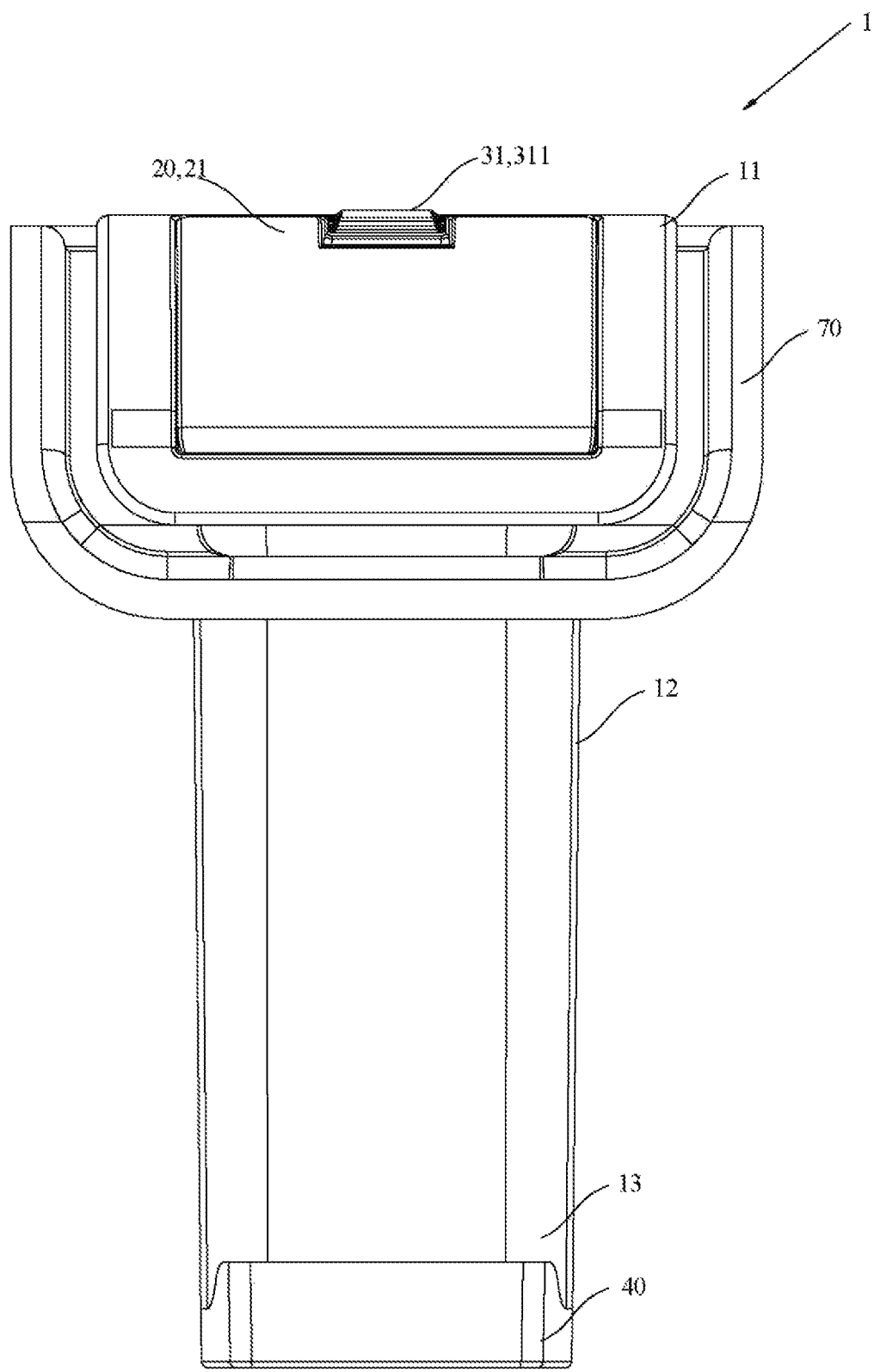
FIG. 1 is a schematic structural front view of the portable charger connection frame of the present invention according to a preferred embodiment.
Figure 2:
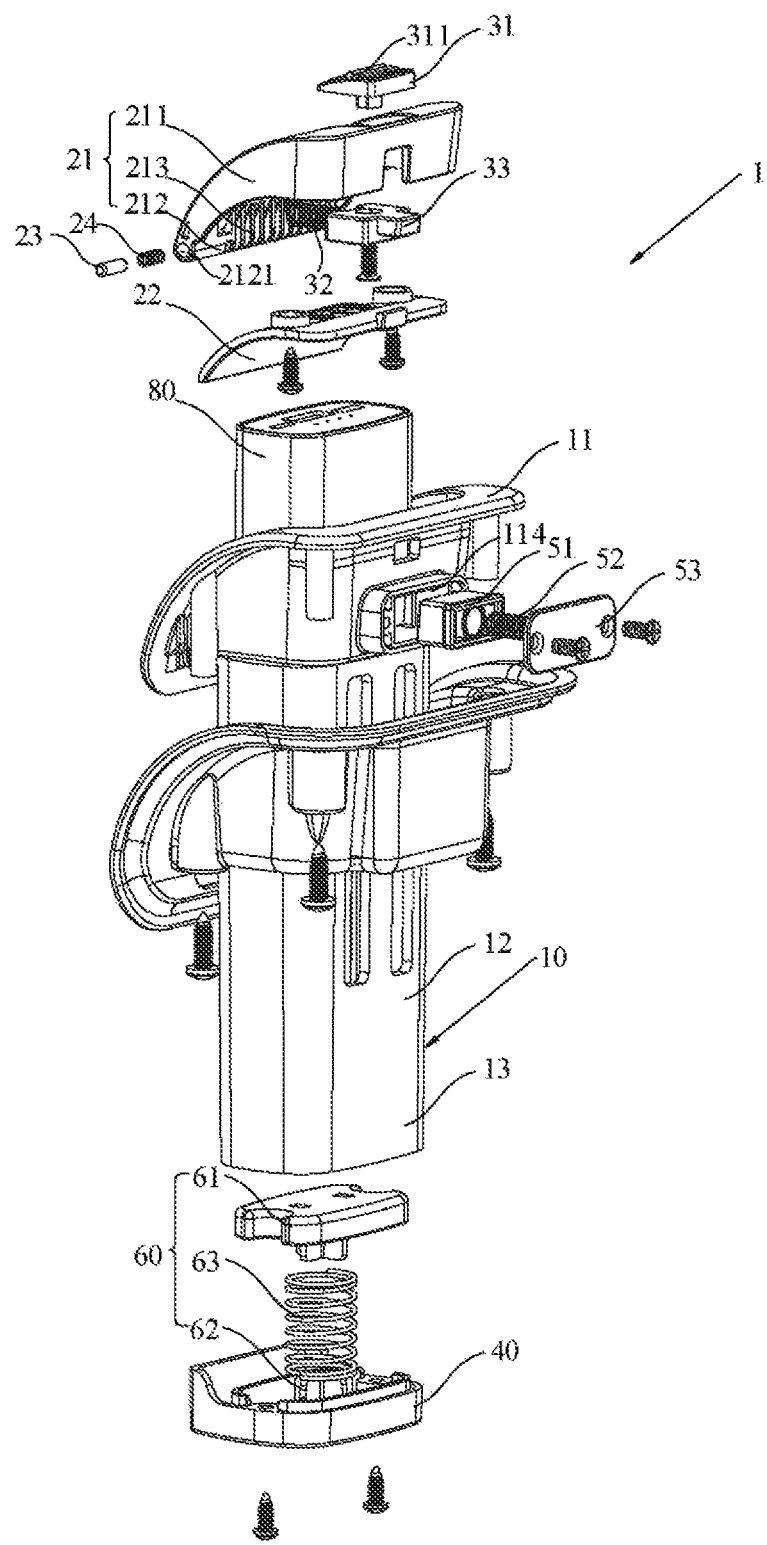
FIG. 2 is a schematic structural exploded view of the portable charger connection frame of the present invention according to a preferred embodiment.
Figure 3:
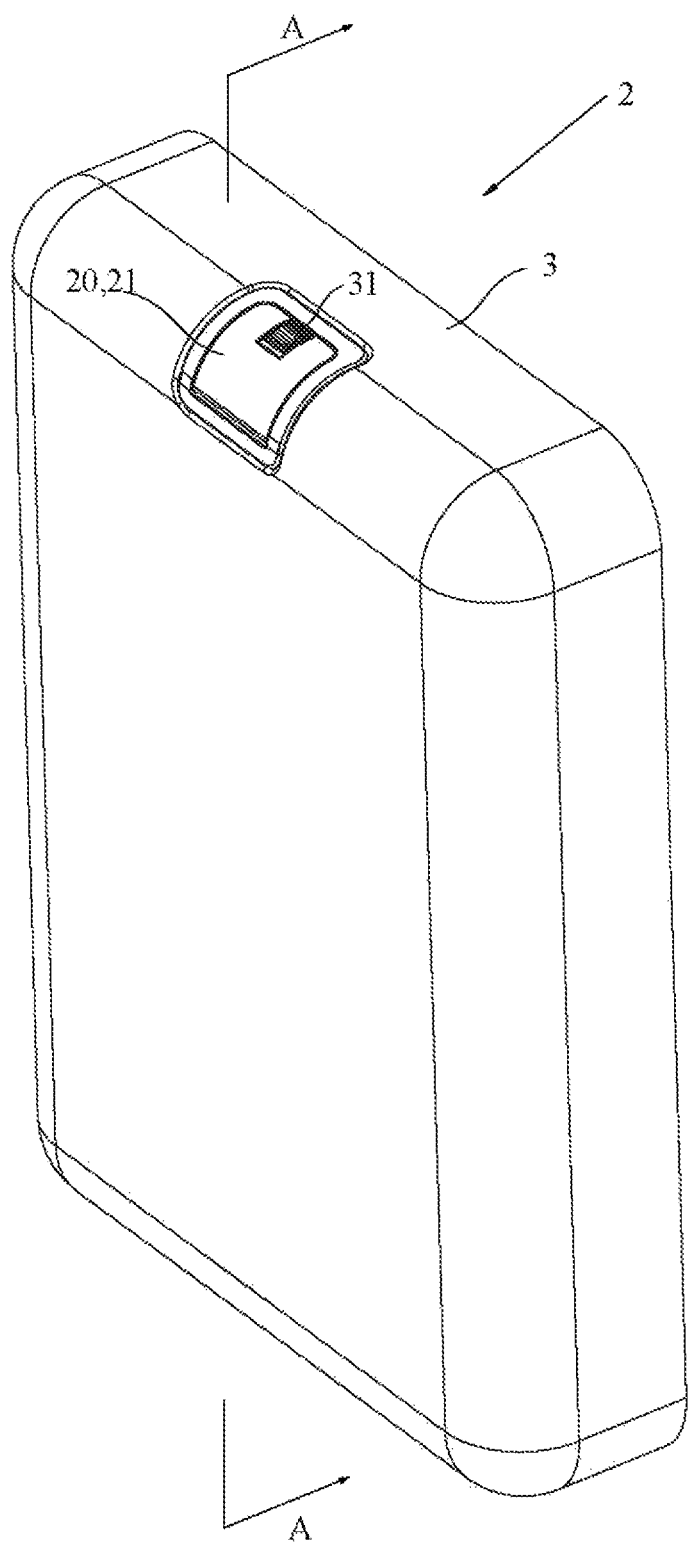
FIG. 3 is a schematic illustrating partial structural three dimensional view of the partial structure of the present invention according to a preferred embodiment.
Figure 4:
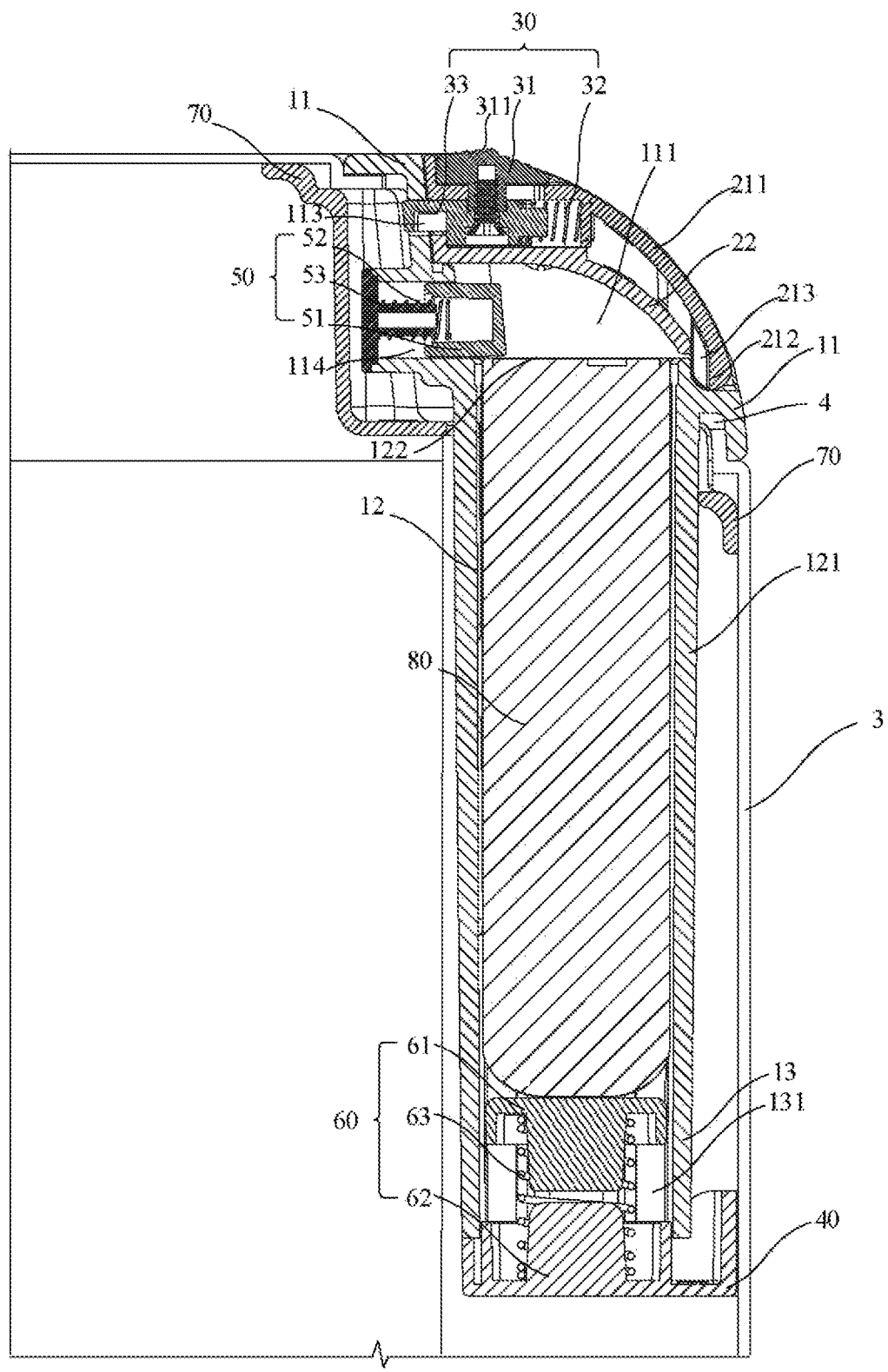
FIG. 4 is a schematic structural section view taken along section A-A in FIG. 3.
Figure 5:
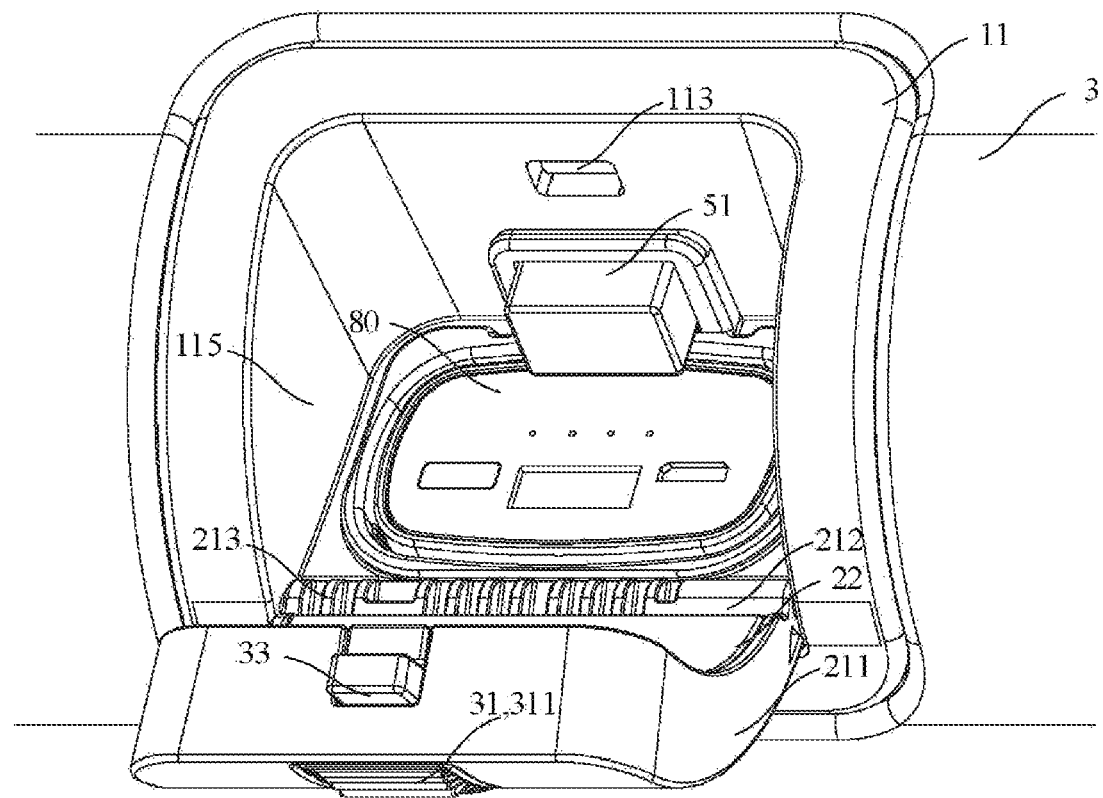
FIG. 5 is a schematic illustrating partial structural three dimensional view of opened cover body of the portable charger connection frame of the present invention according to a preferred embodiment.

Please refer to FIGS. 1 to 5 integrally for understanding. The present embodiment provides a portable charger connection frame 1; the portable charger connection frame 1 comprises: a storage box 10, a cover body 20, an engaging element 30, a fastening element 50, a supporting element 60 and a sheath 70.

The storage box 10 includes a head portion 11, a body 12 and an end portion 13, which are sequentially connected. The head portion 11 has a head accommodation chamber 111. The body 12 has a body accommodation chamber 121 where a portable charger 80 is placed. One end of the body accommodation chamber 121 close to the head accommodation chamber 111 has an opening 122 communicating with the head accommodation chamber 111. The end portion 13 of the storage box 10 is arranged with an end accommodation chamber 131, the end accommodation chamber 131 communicates with the body accommodation chamber 121, and the other end of the end accommodation chamber 131 is fastened with a rear cover 40. Through arranging the storage box 10 to provide an independent accommodation space for the portable charger 80, it is convenient for user's usage. Specifically, The portable charger 80 is placed in the body accommodation chamber 121 through the opening 122 and no need to be placed in a case 2; the opening 122 is conveniently uncovered or closed by rotating the cover body 20, and accordingly the portable charger 80 is conveniently placed into or taken away to make charging operation save time and easy. At the same time, during the charging process, the data cable of the portable charger 80 can be connected through the opening 122, so that the portable charger 80 can always be placed in the body accommodation chamber 121 without holding at hand, which is very convenient. Preferably, the body accommodation chamber 121 has a rectangular box structure and the opening 122 has a rectangular structure.

The cover body 20 is in the head accommodation chamber 111, the cover body 20 covers the opening 122, and the cover body 20 is pivotally connected to a side wall 115 of the head portion 11. By arranging the engaging element 30 to restrict the cover body 20 from leaving the head accommodation chamber 111 to protect the portable charger 80 in the storage box 10, meanwhile the cover body 20 can be easily switched between the state of closing the opening 122 and the state of uncovering the opening 122.

The cover body 20 includes an upper cover 21 and a lower cover 22. The upper cover 21 includes an upper cover body 211, a connecting portion 212, and a plurality of ribs 213. The lower cover 22 is fastened to a lower edge of the upper cover body 211.

The upper cover body 211 and the connecting portion 212 are connected. The plurality of ribs 213 are disposed parallel to each other and spaced. The plurality of ribs 213 are all disposed on one surface of the upper cover body 21 facing the head accommodation chamber 111. The plurality of ribs 213 all extend to one end of the connecting portion 212 away from the body 12 from the other end of the connecting portion 212 close to the body 12.

One side of the connecting portion 212 is provided with a first mounting hole 2121. One end of a pin 23 is located in the first mounting hole 2121, and the other end of the pin 23 is located in the second mounting hole on the side wall 115 of the head portion 11 (not shown in the figure). The first mounting hole 2121 and the second mounting hole are respectively disposed at two ends of the pin 23, so that the cover body 20 rotates around the side wall 115 of the head portion 11, so that the opening 122 can be uncovered or closed easily. Through arranging the ribs 213 to reinforce the support between body 12 and the connecting portion 212, meanwhile the weight of the overall structure itself and the manufacturing cost are reduced, and there also is an effect of avoiding the deformation of the upper cover 21.

The cover body 20 further includes a cover elastic member 24. The cover elastic member 24 is disposed in the first mounting hole 2121. The cover elastic member 24 is disposed between the pin 23 and the inner periphery surface of the first mounting hole 2121. In this way, through arranging the cover elastic member 24, it is convenient to detach the cover body 20 from the side wall 115 of the head portion 11, thus to facilitate installation and maintenance work.

The engaging element 30 is for restricting the cover body 20 from leaving the head accommodation chamber 111. Through releasing the cover 20 by the engaging element 30, the portable charger 80 in the storage box 10 thus can be used, which is greatly convenient for the user's usage. The engaging element 30 includes a button 31 and a first resilient member 32. One end of the button 31 is slidably disposed on the outer wall of the cover body 20. The other end of the button 31 is arranged with a lock block 33, and one end of the lock block 33 is located in the cover body 20. The head portion 11 of the storage box 10 is arranged with a through hole 113 at a position corresponding to the lock block 33, and the other end of the lock block 33 is engaged into the through hole 113. The first resilient member 32 is in the cover body 20, and the first resilient member 32 is disposed between the lock block 33 and the inner wall of the cover body 20 in the horizontal direction. Wherein, when the button 31 encounters external force directed away from the through hole 113 in the horizontal direction, the lock block 33 is disengaged from the through hole 113, which makes the cover body 20 able to be separated from the head accommodation chamber 11.

In the present embodiment, the upper surface of the button 31 is arranged with a plurality of non-slip portions 311, and the plurality of non-slip portions 311 are parallel to each other and perpendicular to the sliding direction of the button 31, and the adjacent non-slip portions 311 are arranged to adjoin each other. Thus, through arranging the non-slip portions 311 to increase the frictional force of the contact surface, applied force is saved when the user slides the button 31. The shape of the non-slip portion 311 is arc. The height of the non-slip portions 311 located at the center of the button 31 is higher than the height of the non-slip portions 311 at two ends of the button 31, and the height of the non-slip portion 311 is sequentially decreased from the center of the button 31 to two ends of the button 31.

One end of the head portion 11 of the storage box 10 near the body 12 of the storage box 10 is arranged with a fastening element 50 used for restricting the portable charger 80 leaving the body accommodation chamber 121. The fastening element 50 includes a sliding member 51, a second resilient member 52 and a connecting member 53. A position-limiting recess 114 is made on the side wall 115, and the sliding member 51 extends into the position-limiting recess 114. One end of the connecting member 53 is outside the position-limiting recess 114, and the second resilient member 52 is inside the position-limiting recess. One end of the second resilient member 52 connects to the sliding member 51, and the other end of the second resilient member 52 connects to the other end of the connecting member 53. The sliding member 51 can enter the head accommodation chamber 111 or back away out of the head accommodation chamber 111.

The supporting element 60 is disposed in the end accommodation chamber 131 for supporting the portable charger 80. The supporting element 60 includes a support frame 61, a support base 62 and a third resilient member 63. One end of the support base 62 is fixed to a surface of the rear cover 40 facing the end accommodation chamber 131, and the other end of the support base 62 is located in the end accommodation chamber 131. The support frame 61 is used to support the portable charger 80, and the third resilient member 63 is connected to the support base 62 and the support frame 61. Through providing the supporting element 60 to exert outward ejection force on the portable charger 80 all the time, so that when the fastening element 50 releases the portable charger 80, the portable charger 80 can be easily ejected, and the user can conveniently take the portable charger 80. Specifically, when the charging treasure 80 is placed, the portable charger 80 will press down to move the support frame 61 downward and compress the third resilient member 63 to deform; when the portable charger 80 is to be taken out, the fastening element 50 releases the portable charger 80, and the portable charger 80 would bounce upward because of the action of the third resilient member 63, thus very convenient to take the portable charger 80.

In the present embodiment, the cover elastic member 24, the first resilient member 32, the second resilient member 52 and the third resilient member 63 all are springs.

The portable charger connection frame 1 further includes a sheath 70 that is fixed to the outer periphery of the head portion 11 of the storage box 10. Through providing the sheath 70, for one thing the portable charger connection frame 1 is protected, and besides it is convenient to subsequently install the luggage charging device 1 on the shell 3 of the case 2.

The invention also provides a case 2, and the case 2 comprising a portable charger connection frame 1 as above. The case 2 further includes a shell 3, and the portable charger connection frame 1 is arranged into the shell 3, and the upper surface of the cover 20 is in the same plane as the upper surface of the shell 3. In this way, the portable charger connection frame 1 is disposed at the top portion of the shell 3, i.e., a position away from the ground; and the portable charger connection frame 1 is disposed on the side of the pull rod of the case 2 so as not to affect the usage of the luggage 2 pull rod.

Specifically, the upper surface of the shell 3 is provided with a mounting opening 4 in which the portable charger connection frame 1 is located. The inner circumference of the mounting opening 4 is engaged between the outer circumference of the head portion 11 of the portable charger connection frame 1 and the inner circumference of the sheath 70 of the portable charger connection frame 1. At the same time, in order to fix the portable charger connection frame 1 more firmly, the rear cover 40 of the portable charger connection frame 1 is fixed to the inner surface of the shell 3. The rotational motion of the cover body 20 of the portable charger connection frame 1 does not interfere with the taking and placing the portable charger 80 from the storage box 10.

As for the portable charger connection frame and the case comprising the same according to the present invention, the portable charger is placed into the storage box, and the portable charger is directly used, taken and placed through detaching the cover body, such that the charging operation saves time and is easy.

What is claimed is:

1. A portable charger connection frame, comprising:
a storage box including a head portion, a body and an end portion, which are sequentially connected, wherein
the head portion has a head accommodation chamber, the body has a body accommodation chamber where a portable charger is placed, and
one end of the body accommodation chamber close to the head accommodation chamber has an opening communicating with the head accommodation chamber;
a cover body located in the head accommodation chamber, wherein the cover body covers the opening and is pivotally connected to a side wall of the head portion; and
an engaging element used to restrict the cover body from leaving the head accommodation chamber, wherein the engaging element includes
a button, wherein
one end of the button is slidably disposed on an outer wall of the cover body, and the other end of the button is arranged with a lock block, and one end of the lock block is located in the cover body, and the head portion of the storage box is arranged with a through hole at a position corresponding to the lock block, and the other end of the lock block is engaged into the through hole, and
a first resilient member located in the cover body, the first resilient member being disposed between the lock block and an inner wall of the cover body in a horizontal direction, wherein
when the button encounters external force directed away from the through hole in the horizontal direction, the lock block is disengaged from the through hole, so as to separate the cover body from the head accommodation chamber.

2. The portable charger connection frame according to claim 1,
wherein the cover body comprises an upper cover and a lower cover, and the upper cover comprises an upper cover body and a connecting portion, which are connected to each other, and
wherein the lower cover is fastened to a lower edge of the upper cover body, and one side of the connecting portion is provided with a first mounting hole, and
wherein one end of a pin is located in the first mounting hole, and the other end of the pin is located in a second mounting hole on the side wall of the head portion.

3. The portable charger connection frame according to claim 2,
wherein the cover body further includes a cover elastic member and the cover elastic member is located in the first mounting hole, and
wherein the cover elastic member is disposed between the pin and the first mounting hole.

4. The portable charger connection frame according to claim 2, wherein
the upper cover further includes a plurality of ribs,
the plurality of ribs are all disposed on one surface of the upper cover body facing the head accommodation chamber, and
the plurality of ribs all extend to one end of the connecting portion away from the body from the other end of the connecting portion close to the body.

5. The portable charger connection frame according to claim 1,
wherein an upper surface of the button is arranged with a plurality of non-slip portions,
wherein the plurality of non-slip portions are parallel to one another and perpendicular to a sliding direction of the button, and
wherein the non-slip portions are arranged to adjoin one another.

6. The portable charger connection frame according to claim 1,
wherein one end of the head portion of the storage box near the body of the storage box is arranged with a fastening element used for restricting the portable charger leaving the body accommodation chamber;
wherein the fastening element comprises a sliding member, a second resilient member and a connecting member, and a position-limiting recess is made on the side wall of the head portion, and the sliding member extends into the position-limiting recess;
wherein one end of the connecting member is outside the position-limiting recess, and the second resilient member is inside the position-limiting recess;
wherein one end of the second resilient member connects to the sliding member, and the other end of the second resilient member connects to the other end of the connecting member; and
wherein the sliding member can enter the head accommodation chamber or back away out of the head accommodation chamber.

7. The portable charger connection frame according to claim 1,
wherein the end portion of the storage box is arranged with an end accommodation chamber, one end of the end accommodation chamber communicates with the body accommodation chamber, and the other end of the end accommodation chamber is fastened with a rear cover;
wherein a supporting element is disposed in the end accommodation chamber for supporting the portable charger, and the supporting element includes a support frame, a support base and a third resilient member;
wherein one end of the support base is fixed to a surface of the rear cover facing the end accommodation chamber, and the other end of the support base is located in the end accommodation chamber; and
wherein the support frame is used to support the portable charger, and the third resilient member is connected to the support base and the support frame.

8. The portable charger connection frame according to claim 1, wherein the portable charger connection frame further includes a sheath that is fixed to the outer periphery of the head portion of the storage box.

9. A case, comprising:
a portable charger connection frame, comprising:
a storage box including a head portion, a body and an end portion, which are sequentially connected, wherein the head portion has a head accommodation chamber, the body has a body accommodation chamber where a portable charger is placed, and one end of the body accommodation chamber close to the head accommodation chamber has an opening communicating with the head accommodation chamber;
a cover body located in the head accommodation chamber, wherein the cover body covers the opening and is pivotally connected to a side wall of the head portion; and an engaging element used to restrict the cover body from leaving the head accommodation chamber, wherein the engaging element includes:
    a button, wherein
        one end of the button is slidably disposed on an outer wall of the cover body, and the other end of the button is arranged with a lock block, and one end of the lock block is located in the cover body, and
        the head portion of the storage box is arranged with a through hole at a position corresponding to the lock block, and the other end of the lock block is engaged into the through hole, and
    a first resilient member located in the cover body, the first resilient member being disposed between the lock block and an inner wall of the cover body in a horizontal direction, wherein
    when the button encounters external force directed away from the through hole in the horizontal direction, the lock block is disengaged from the through hole, so as to separate the cover body from the head accommodation chamber.

10. The case according to claim 9, wherein the cover body comprises an upper cover and a lower cover, and the upper cover comprises an upper cover body and a connecting portion, which are connected to each other, and wherein the lower cover is fastened to a lower edge of the upper cover body, and one side of the connecting portion is provided with a first mounting hole, and
wherein one end of a pin is located in the first mounting hole, and the other end of the pin is located in a second mounting hole on the side wall of the head portion.

11. The case according to claim 10, wherein the cover body further includes a cover elastic member and the cover elastic member is located in the first mounting hole, and
wherein the cover elastic member is disposed between the pin and the first mounting hole.

12. The case according to claim 10, wherein
the upper cover further includes a plurality of ribs,
the plurality of ribs are all disposed on one surface of the upper cover body facing the head accommodation chamber, and
the plurality of ribs all extend to one end of the connecting portion away from the body from the other end of the connecting portion close to the body.

13. The case according to claim 9,
wherein an upper surface of the button is arranged with a plurality of non-slip portions,
wherein the plurality of non-slip portions are parallel to one another and perpendicular to a sliding direction of the button, and
wherein the non-slip portions are arranged to adjoin one another.

14. The case according to claim 9,
wherein one end of the head portion of the storage box near the body of the storage box is arranged with a fastening element used for restricting the portable charger leaving the body accommodation chamber;
wherein the fastening element comprises a sliding member, a second resilient member and a connecting member, and a position-limiting recess is made on the side wall of the head portion, and the sliding member extends into the position-limiting recess;
wherein one end of the connecting member is outside the position-limiting recess, and the second resilient member is inside the position-limiting recess;
wherein one end of the second resilient member connects to the sliding member, and the other end of the second resilient member connects to the other end of the connecting member; and
wherein the sliding member can enter the head accommodation chamber or back away out of the head accommodation chamber.

15. The case according to claim 9, wherein the end portion of the storage box is arranged with an end accommodation chamber, one end of the end accommodation chamber communicates with the body accommodation chamber, and the other end of the end accommodation chamber is fastened with a rear cover;
wherein a supporting element is disposed in the end accommodation chamber for supporting the portable charger, and the supporting element includes a support frame, a support base and a third resilient member;
wherein one end of the support base is fixed to a surface of the rear cover facing the end accommodation chamber, and the other end of the support base is located in the end accommodation chamber; and
wherein the support frame is used to support the portable charger, and the third resilient member is connected to the support base and the support frame.

16. The case according to claim 9, wherein the portable charger connection frame further includes a sheath that is fixed to the outer periphery of the head portion of the storage box.

\* \* \* \* \*